United States Patent
Pich (10) Patent No.: US 10,227,135 B1
(45) Date of Patent: Mar. 12, 2019

(54) REDUNDANT CLUSTERED PARACHUTE APPARATUS

(71) Applicant: John D. Pich, Chandler, AZ (US)

(72) Inventor: John D. Pich, Chandler, AZ (US)

( * ) Notice: Subject to any disclaimer, the term of this patent is extended or adjusted under 35 U.S.C. 154(b) by 339 days.

(21) Appl. No.: 15/295,890

(22) Filed: Oct. 17, 2016

(51) Int. Cl.
*B64D 17/06* (2006.01)
*B64D 17/04* (2006.01)
*B64D 17/40* (2006.01)

(52) U.S. Cl.
CPC ............ *B64D 17/06* (2013.01); *B64D 17/04* (2013.01); *B64D 17/40* (2013.01)

(58) Field of Classification Search
CPC ........ B64D 17/00; B64D 17/02; B64D 17/04; B64D 17/06; B64D 17/08; B64D 19/00; A63H 33/20
See application file for complete search history.

(56) References Cited

U.S. PATENT DOCUMENTS

| | | |
|---|---|---|
| 1,273,553 A | 7/1918 | Upson |
| 1,287,134 A | 12/1918 | Swanson |
| 1,308,375 A | 7/1919 | Satre |
| 1,499,266 A | 6/1924 | Vieregg |
| 1,705,909 A * | 3/1929 | De Witt ................ B64D 17/00 244/142 |
| 1,782,134 A * | 11/1930 | Coplen ................ B64D 25/12 244/139 |
| 1,864,298 A * | 6/1932 | De Witt ................ B64D 17/52 244/142 |
| 2,104,966 A * | 1/1938 | Baker ................ B64D 17/00 244/145 |
| 2,175,229 A * | 10/1939 | Swofford ............. B64D 17/00 244/142 |
| 2,363,970 A * | 11/1944 | Kalep ................ A63H 33/20 124/21 |
| 2,723,094 A | 11/1955 | Berckmuller |
| 3,170,660 A * | 2/1965 | Kehlet ................ B64G 1/62 244/152 |
| 3,780,970 A | 12/1973 | Pinnell |
| 4,752,050 A | 6/1988 | Johnson |
| 4,955,563 A | 9/1990 | Lee et al. |
| 5,890,678 A * | 4/1999 | Butler, Jr. ............. B64D 17/08 244/152 |
| 8,690,105 B2 * | 4/2014 | Liao ................ B64D 17/14 244/142 |

* cited by examiner

*Primary Examiner* — Joseph W Sanderson
(74) *Attorney, Agent, or Firm* — Thomas W. Galvani, P.C.; Thomas W. Galvani (57) ABSTRACT

A redundant clustered parachute apparatus includes a harness and a plurality of lines operatively coupled to the harness. Each line has a length and a plurality of canopies coupled to and along the length. The plurality of canopies, across the plurality of lines, create an aggregated force of air resistance to slow a falling object in the harness. Loss of some of the canopies or some of the lines does not significantly affect the performance of the redundant clustered parachute apparatus to safely deliver the object to the ground.

20 Claims, 7 Drawing Sheets

REDUNDANT CLUSTERED PARACHUTE APPARATUS

FIELD OF THE INVENTION

The present invention relates generally to parachutes, and more particularly to clustered parachutes.

BACKGROUND OF THE INVENTION

Parachutes are used to slow down fast-moving objects or people, especially against the force of gravity as they fall from height. Vehicles on the ground that are moving very fast, such as dragsters or landing aircraft, also sometimes use parachutes to slow their momentum. Parachutes are important as life-saving or property-saving devices. Parachutes can, of course, also be used in recreational activities. Whatever the purpose, the failure of the parachute to operate properly usually results in catastrophic consequences, namely the death, severe injury, or destruction of whatever the parachute is supposed to be slowing.

Parachute failure can result from a number of causes. The parachute may rip. The parachute may fail to open. It may open only partially. The parachute may become tangled. The pull mechanisms for triggering the parachute may fail. There are many reasons a parachute can fail, and any one of them can be devastating.

Conventional parachutes are constructed with a canopy tethered to a load with cords or groups of cords. The canopy provides drag or lift and thereby controls the descent and movement of the parachute's load. In some cases, two or three canopies are used in one parachute, so there are several sets of cords with a canopy attached to the end of each set. However, since the parachute is preferably packable or small enough to be transported, a limited number of cords and canopies can usually be provided with this construction. The breaking of a cord can be catastrophic because the canopy may no longer be held fully open, or even partially open, to create drag against the air. Likewise, a canopy tearing or failing to open is catastrophic because the canopy provides all of the drag slowing the falling object. This is, of course, an event that is essentially impossible to fix once it has occurred, as most free-falling objects have very little time before impact, and the canopy is generally spaced apart from the falling object. An improved, safer parachute system is needed.

SUMMARY OF THE INVENTION

A redundant clustered parachute apparatus includes a harness and a plurality of lines operatively coupled to the harness. Each line has a length and a plurality of canopies coupled to and along the length. The plurality of canopies, across the plurality of lines, create an aggregated force of air resistance to slow a falling object in the harness. Loss of some of the canopies or some of the lines does not significantly affect the performance of the redundant clustered parachute apparatus to safely deliver the object to the ground.

BRIEF DESCRIPTION OF THE DRAWINGS

Referring to the drawings.

DETAILED DESCRIPTION

Figure 1:
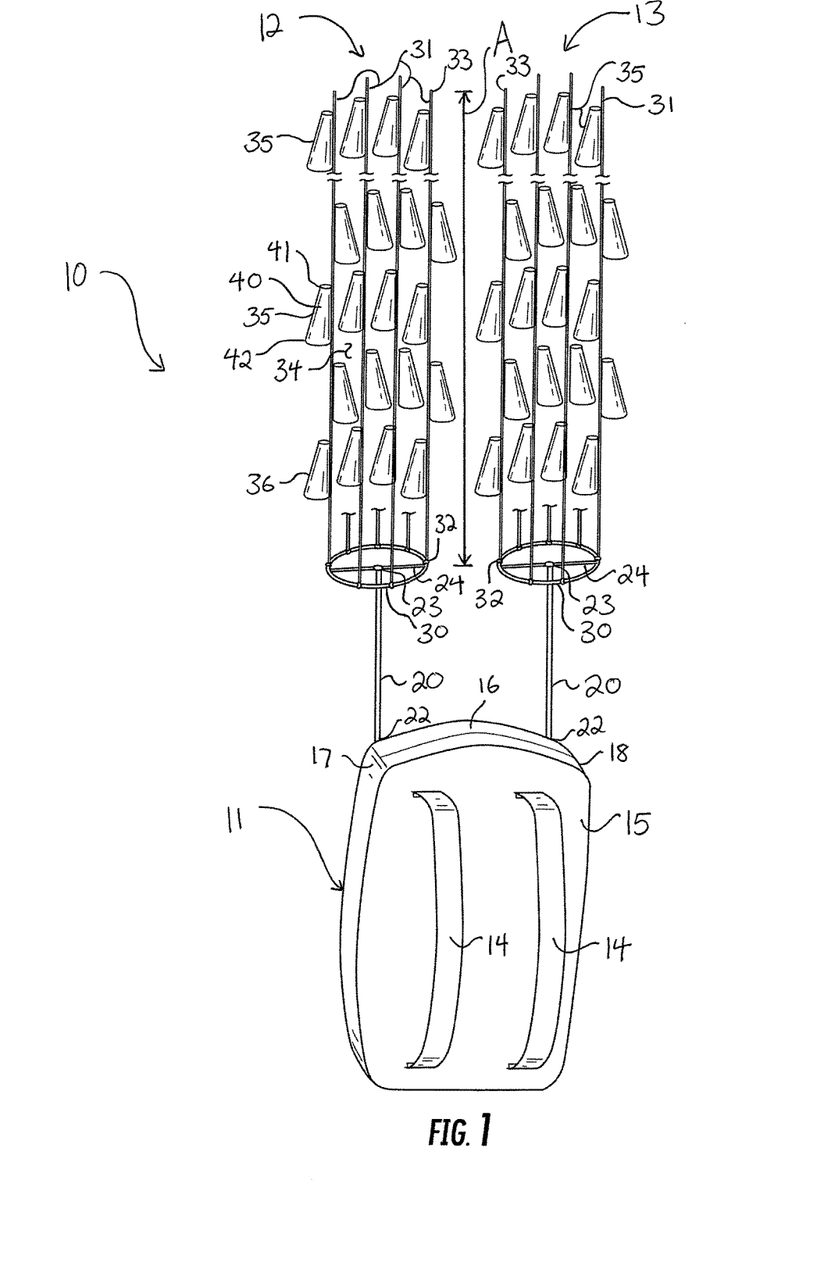
FIG. 1 is a front perspective view of a redundant clustered parachute apparatus having a harness and a pair of clustered parachute assemblies.

Reference now is made to the drawings, in which the same reference characters are used throughout the different figures to designate the same elements. FIG. 1 shows a redundant clustered parachute apparatus 10 ("parachute apparatus 10") that provides redundancy which conventional parachutes do not, by using a unique clustered arrangement of small canopies. The parachute apparatus 10 includes a harness 11 and two clustered parachute assemblies 12 and 13 extending from the harness 11. Each assembly 12 and 13 has a plurality of very long suspension lines 31 (simply, "lines 31"), to which a very large number of small canopies 35 are attached. Thus, the parachute apparatus 10 has a great deal of redundancy against failure or loss: there is a redundant line 31 for every line 31, and within each line 31, there is a redundant canopy 35 for every canopy 35. The parachute apparatus 10 is thus a safer alternative to conventional parachutes.

The harness 11 attaches to and suspends a person or other load as the person or load falls through the air. In FIG. 1, the harness 11 is a conventional backpack-type parachute harness, but one having reasonable skill in the art will recognize that the harness 11 may be of different types depending on the application it is used for, such as a set of straps for surrounding a crate to be dropped with a parachute. The harness 11 has adjustable straps 14 coupled to a pack 15.

The pack 15 has a top 16 to which the clustered parachute assemblies 12 and 13 are attached. The assembly 12 is attached to the pack 15 at a side portion 17 of the top 16, and the assembly 13 is attached to the pack 15 at an opposed side portion 18 of the top 16. The opposed attachment of the assemblies 12 and 13 on the pack 15 helps hold the harness 11 level, mitigates the influence of torque on the pack 15 from either of the assemblies 12 and 13, and keeps the assemblies 12 and 13 apart during the operation of the parachute apparatus 10. The assemblies 12 and 13 are identical; only the assembly 12 is described in detail herein, with the understanding that the description of the assembly 12 applies equally to the assembly 13, except as otherwise noted.

The clustered parachute assembly 12 includes a riser 20 that couples the assembly 12 to the harness 11. The riser 20 is a flexible tether, such as a rope, cord, paracord, webbing, or the like, and has a lower end 22 and an opposed upper end 23. The lower end 22 of the riser 20 is coupled to the top 16 of the pack 15. The opposed upper end 23 is coupled to a tether 24 at approximately the center of the tether 24. The riser 20 is ruggedly and aggressively sewn to the pack 15 and tether 24 to firmly secure it to those parts. The tether 24 is a flexible rope, cord, paracord, webbing, or the like and extends diametrically across and is coupled to a loop or ring 30.

The ring 30 is constructed of a rigid, high-strength material or combination of materials such as aluminum and carries a plurality of lines 31 spaced apart around its circumference. The circumferential spacing of the lines 31 around the ring 30 and the attachment of the riser 20 centrally on the tether 24 aid in holding the ring 30 in a relatively steady, level orientation while the parachute apparatus 10 is in use and airborne. When the parachute apparatus 10 is in use, the canopies 35 create air resistance, provide drag against the air, and thereby apply strong upward forces on each line 31. The lines 31 transfer these upward forces to the ring 30, and the upward forces are transferred to the harness 11 through the tether 24 and riser 20. When the lines 31 exert equal forces, the ring 30 is level and no torque is exerted on the harness 11. The riser 20 and tether 24 also apply the downward force from the weight of the harness 11 and its load to the ring 30, which partially counteracts the upward force of drag. The riser 20 and tether 24 are constructed of slightly elastic material, such as nylon paracord. Such slightly elastic material will yield slightly when placed under a sudden or immediate force to prevent breaking, but will not yield when placed under a constant force, such as those forces exerted on the riser 20 and tether 24 when the assembly 12 initially opens and then remains opened.

Some of the lines 31 are only partially illustrated in FIG. 1 and throughout the drawings for simplicity of the drawings. Each line 31 extends upward from the ring 30 for a long distance, such as several hundred feet. Each line 31 has a lower end 32 that is coupled to the ring 30 and an opposed upper end 33 that is free. The lines 31 are so long that, in FIG. 1, the ends 32 and 33 are shown with a portion of the line 31 removed for clarity of the illustration. Between the ends 32 and 33, each line 31 has a length A, and hundreds of canopies 35 are coupled to each line 31 along the entirety of said length A. Each line 31 is generally circular in cross-section, being constructed of strong, slightly elastic material with a wound construction.

Figure 2:
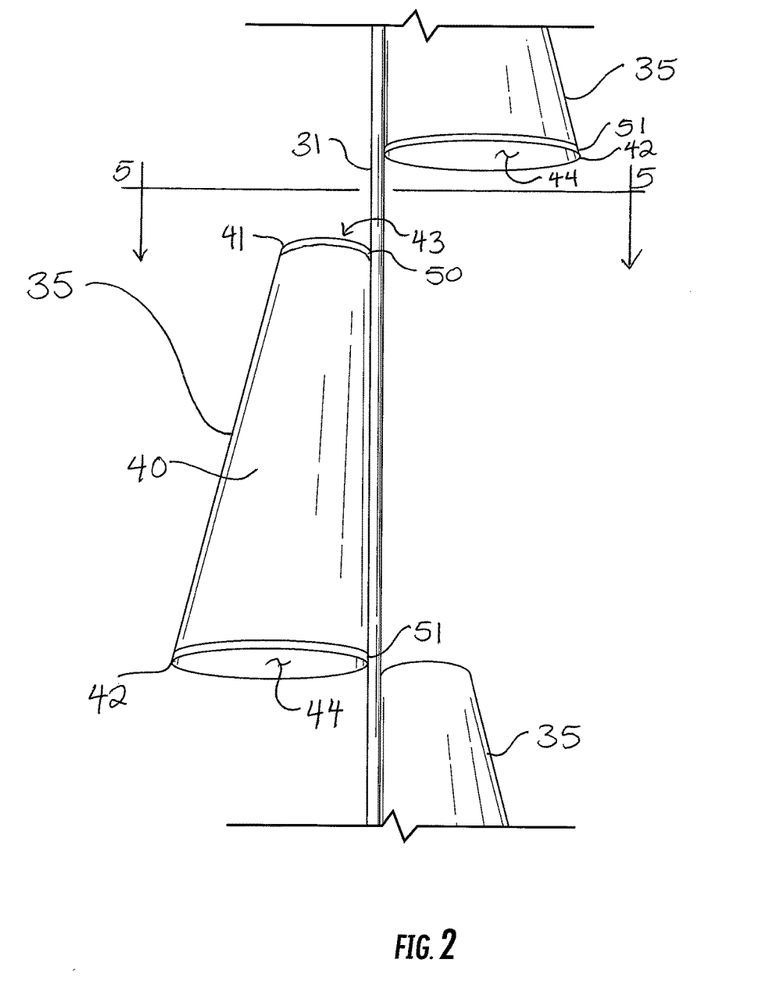
FIG. 2 is an enlarged view of canopies of one of the clustered parachute assemblies of FIG. 1.

Referring now to FIG. 2, one of the canopies 35 is illustrated. The canopy 35 illustrated in FIG. 2 is identical to each of the plurality of canopies 35 in each of the assemblies 12 and 13, and as such, the following discussion will describe this canopy 35 alone, with the understanding that the ensuing description applies equally to all of the other canopies 35, except as otherwise noted. The canopy 35 includes a thin, frusto-conical body 40 extending between an open top 41 and an open bottom 42 of the canopy 35 approximately one to four inches. In some embodiments, the canopy 35 is as much as six to eighteen inches in height, depending on the object being supported and the environment of use. A circular opening 43 is formed at the top 41 of the canopy 35, the body 40 having a generally circular cross-section between the bottom 42 and top 41. At the top 41, the body 40 is reinforced by a band 50, which is a layered and stitched hem that encircles the opening 43. A similar circular opening 44 is formed at the bottom 42 of the canopy 35 which is larger than the opening 43 at the top 41. The body 40 is also reinforced at the bottom 42 by a reinforced band 51 of additional material layered and stitched onto the body 40 that encircles the opening 44. The bands 50 and 51 provide strength and tear resistance to the canopy 35 at the top 41 and bottom 42, respectively, to prevent the initiation of rips. The canopies 35 are thus rugged and durable; the body 40 is formed of a sheet of lightweight, durable, tear-resistant material such as nylon, rip-stop nylon, or the like.

Referring back to FIG. 1, the plurality of canopies 35 are coupled along the length A of each line 31 beginning with a lowermost canopy 36 which is proximate to the end 32 of the line 31 and the ring 30, and continuing up to the free end 33 of the line 31. The canopies 35 are preferably sewn to the lines 31 with stitching that extends between the top 41 and bottom 42 of the body 40. The canopies 35 are each spaced vertically apart from one another along the length A such that the top 41 of a given canopy 35 is located just below the bottom 42 of the next highest canopy 35 on the line 31. In other words, each line 31 has a tiered arrangement of canopies 35.

In addition to the vertical spacing or tiered arrangement of canopies 35 as shown throughout the drawings, the canopies 35 are also arranged around the circumference in one of several ways. FIGS. 1-5 illustrate one manner: an offset arrangement of canopies 35, in which each canopy 35 is located diametrically offset and across the line 31 from the canopies 35 directly above and below it on the line 31. For example, the lowermost canopy 36 is below and opposed from the canopy 35 just above it, which is below and opposed from the canopy 35 just above it, and so on.

This tiered and offset arrangement of the canopies 35 helps to prevent the canopies 35 from interfering with one another when the parachute apparatus 10 is in operation. Because the canopies 35 are located on offset "sides" of the line 31, and because the canopies 35 on different lines 31 are at the same tiers, as shown, the canopies 35 are horizontally spaced apart from each other and do not contact or block each other. Further, the canopies 35 catch, channel, and expel air above them. When they do, the offset canopies 35 do not immediately transmit expelled air into the open bottom 42 of the canopy 35 just above; this helps mitigate deflation of the canopies due to wake turbulence, ensuring that each canopy 35 receives a strong and full laminar flow of air entering the bottom 42 of the canopy 35, which ensures each canopy 35 fully opens. This maintains the canopies 35 in full deployment, which holds the lines 31 taut and straight along their entire lengths A. Moreover, when the lines 31 are held straight, the canopies 35 avoid contact with each other and their staggered arrangement creates a tight matrix of the canopies 35 through and around which air must flow. This additionally provides a drag effect, because the spaces 34 between the canopies 35 slows air as it must move around the canopies 35 and thus increases the air resistance of the entire assembly 12. In this way, relatively small canopies are able to provide the same amount of drag that a much larger canopy provides, due to the aggregated canopy effect from both the canopies 35 themselves and the spaces 34 between the canopies 35.

Figure 6:
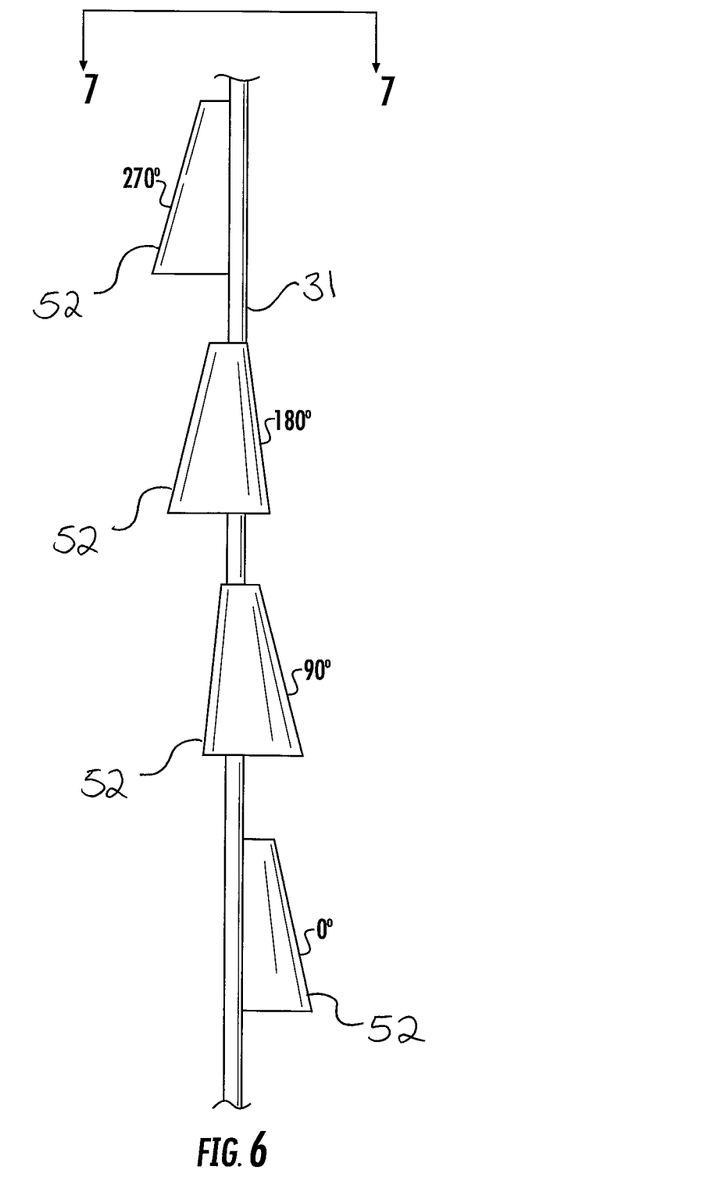
FIG. 6 is an enlarged view of canopies in yet another alternate embodiment of a clustered parachute assembly, showing a helical arrangement of canopies on a line in the clustered parachute assembly.
Figure 7:
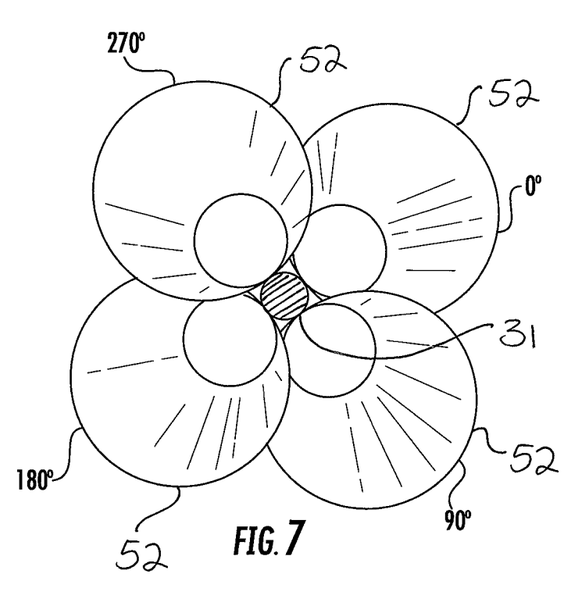
FIG. 7 is a section view taken along the line 7-7 in FIG. 6, showing the helical arrangement of the canopies of FIG. 6.

FIGS. 6 and 7 illustrate an alternate embodiment of the canopies 52 in a clustered parachute assembly. The canopies 52 are identical to the canopies 35 of FIGS. 1 and 2 except in their location around the line 31. As such, the structure of the canopies 52 will not be described, since such description would be repetitive of the description of the canopies 35 presented above. One having ordinary skill in the art will understand that the canopies 52 are formed and attached to the line 31 in the same way as the canopies 35, but are arranged around the line 31 differently.

To that end, the canopies 52 are arranged helically around the line 31. Each canopy 52 is circumferentially offset about the line 31 by approximately ninety degrees with respect to the canopy 52 above and also with respect to the canopy 52 below. For example, in FIG. 6, four canopies 52 are illustrated: the upper most canopy 52 is on a "left" side of the line 31, the next lowest canopy 52 is on a "front" of the line 31 approximately ninety degrees offset from the previous canopy 35, the next lowest canopy 52 is on a "right" side of the line 35 approximately ninety degrees offset from the previous canopy 35, and the lowest canopy 52 is on the "back" side of the line 31 approximately ninety degrees offset from the previous canopy 35. This circumferentially offset arrangement provides further mitigation of wake turbulence, as described above.

The tiered arrangement of the canopies 35, whether in an offset staggered arrangement of the canopies 35 or in a helical arrangement of the canopies 52, together with their frusto-conical shape, allows the canopies 35 to fit together during storage. Each canopy 35 can be nested onto a lower canopy 35 on the same line 31 so that less space is occupied when in storage.

Figure 5:
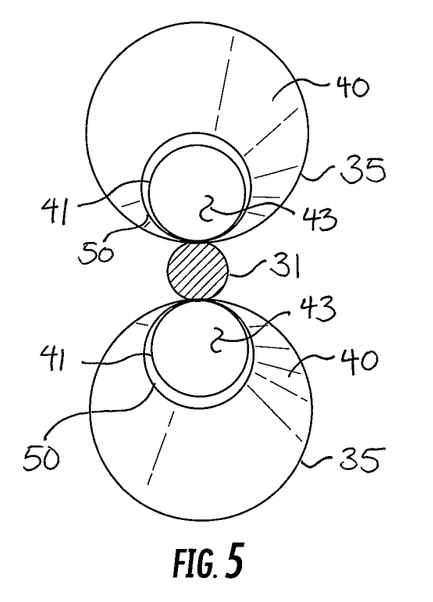
FIG. 5 is a section view taken along the line 5-5 in FIG. 2, showing an offset arrangement of the canopies of the one of the clustered parachute assemblies of FIG. 1.

Referring now principally to the embodiment shown in FIGS. 1, 2, and 5, in operation, the parachute apparatus 10 is used to lower an airborne object safely to the ground. When that object is a person, the person is secured to the harness 11 with his arms applied through the straps 14 of the harness 11. Once airborne, the clustered parachute assemblies 12 and 13 stream and extend upward from the harness 11 with the risers 20 and lines 31 fully extended as shown in FIG. 1.

The parachute leverages a number of benefits of its unique structure, such as the aggregated drag effect of a huge number of small canopies 35, the unexpected drag effect of air flowing around and between the canopies 35, and the redundancy of all of the canopies 35.

As the parachute apparatus 10 falls, each canopy 35 takes in air through the bottom opening 44 and funnels air out through the smaller top opening 43. In this way, the canopies 35 cooperate to provide drag and guide the parachute apparatus 10 safely to the ground. Further, air is circuitously channeled between the canopies 25, providing an additional drag benefit not realized by conventional single-canopy parachutes or conventional clustered parachutes. If one of the canopies 35 tears, breaks off, or fails to open, the operation of the parachute apparatus 10 is not significantly affected because the upward force on each line 31 is derived from the combined drag force of many canopies 35 on that line 31; the loss of one canopy 35 is thus fairly trivial in comparison to the total combined force. Likewise, even the failure of an entire line 31, such as if one of the lines 31 comes free of the ring 30, represents a relatively small reduction in the total amount of upward force the parachute apparatus 10 provides to resist free fall.

Figure 3:
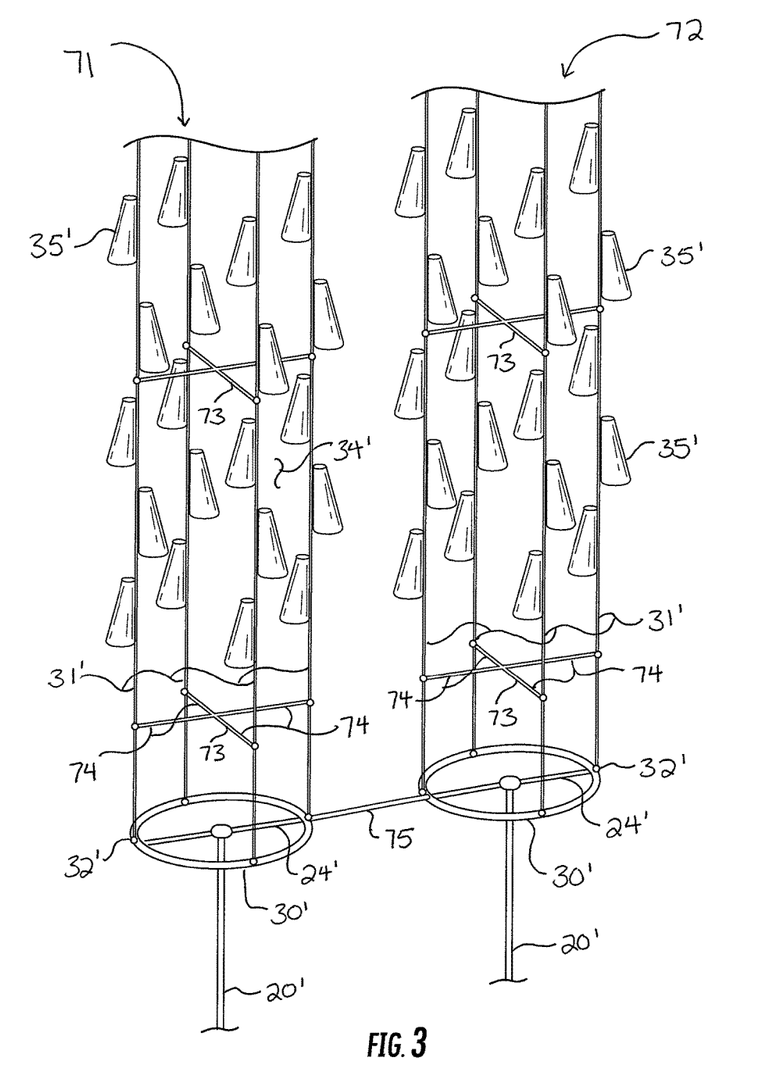
FIG. 3 is a front perspective view of an alternate embodiment of clustered parachute assemblies for an alternate embodiment of a redundant clustered parachute apparatus.

FIG. 3 shows an alternate embodiment of clustered parachute assemblies 71 and 72. The clustered parachute assemblies 71 and 72 include some of the same structural features and elements as the previously described assemblies 12 and 13. These structural features and elements of the assemblies 71 and 72 which are the same as corresponding structural features and elements of the assembly 12 are marked with identical reference characters and a prime ("'") symbol to distinguish them from those of the assembly 12. One having ordinary skill in the art will readily understand their structure and function from the previous discussion; accordingly, less description is devoted to said features and elements here.

The clustered parachute assemblies 71 and 72 are each coupled to a harness (not shown in FIG. 3) by a riser 20'. Each assembly includes a tether 24', a ring 30', lines 31', and canopies 35'. Additionally, each assembly includes a plurality of frameworks 73 located between the lines 31' above and proximate to the ring 30'. Only two frameworks 73—the lowest two frameworks 73—are visible in FIG. 3, but one having ordinary skill in the art will readily appreciate that a large number of frameworks 73 are spaced along the entire length A of the lines 31' at defined intervals. Some embodiments have more frameworks 73, while others have fewer frameworks 73, such as one, two (as shown in FIG. 3), three, or none (as the embodiment of FIG. 1). The framework 73 assists in stabilizing the lines 31'. The framework 73 has four arms 74 extending from a central point. The end of each arm 74 is coupled to one of the lines 31' just above the end 32' of the line 31', where said line 31' is coupled to the ring 30' as previously described. Conversely, each line 31' of the assemblies 71 and 72 is coupled to an arm 74 of the framework 73. In the embodiment shown in FIG. 3, the framework 23 has four arms 74 each extending radially from a center at which the arms 74 are joined. In other embodiments, in which there are more lines 31', there are correspondingly more arms 74. For example, if a very large object is being supported by the clustered parachute assemblies 71 and 72, then instead of four arms 74 in each framework 73, there may be five, six, seven, eight, or more arms 74 in the framework 73, each extending from the center to one of the lines 31'. In one embodiment, the framework 73 is a flexible framework, constructed from a nylon webbing, paracord, or the like. In another embodiment, the framework 73 has a rigid structure that holds the lines 31' away from each other and reduces the likelihood that they will become tangled. In addition, the rings 30' of the clustered parachute assemblies 71 and 72 are separated yet coupled to each other by a transverse tether 75. The transverse tether 75 maintains the assemblies 71 and 72 at a constant, spaced-apart distance from each other. The transverse tether 75, in one embodiment, is a flexible element, and in other embodiments, is rigid, similar to the framework 73.

In FIG. 3, the canopies 35' are disposed in a tiered, offset arrangement as in the parachute apparatus 10 canopies 35 of FIGS. 1 and 2. However, one having ordinary skill in the art will appreciate that the canopies 35' of assemblies 71 and 72 may also be disposed in a tiered, helical arrangement similar to the canopies 52 shown in FIGS. 6 and 7.

Figure 4:
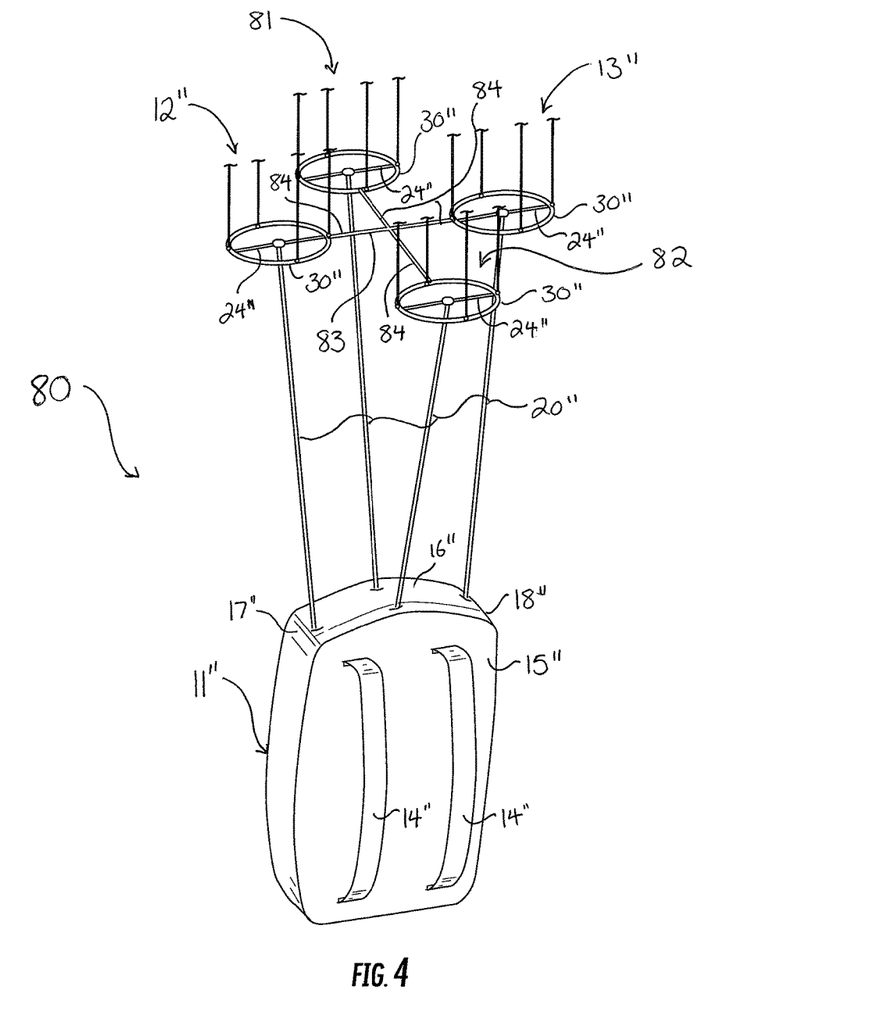
FIG. 4 is a front perspective view of another alternate embodiment of a redundant clustered parachute apparatus.

FIG. 4 shows yet another alternate embodiment of a parachute apparatus 80. The parachute 80 includes some of the same structural features and elements as the previously described parachute apparatus 10. Those structural features and elements of the parachute 80 which are the same as corresponding structural features and elements in the parachute apparatus 10 are marked with identical reference characters and a double prime ("''") symbol to distinguish them from those of parachute apparatus 10. One having ordinary skill in the art will readily understand their structure and function from the previous discussion; accordingly, less description is devoted to said structural features and elements here.

The parachute 80 includes a harness 11" that is identical to the harness 11 of parachute apparatus 10. Parachute 80 includes four clustered parachute assemblies rather than two, each of which has risers 20" that connect tethers 24" and rings 30" to the harness 11". The rings 30" carry a plurality of lines 31" each having a plurality of canopies. The canopies are not shown in FIG. 4 for simplicity of the drawings, but are similar to the canopies 35 of parachute apparatus 10. One having ordinary skill in the art will readily appreciate that the canopies of the parachute 80 may be disposed either in the tiered and clustered arrangement, similar to the canopies 35, or in the tiered and helical arrangement, similar to the canopies 52. The parachute 80 includes two more clustered parachute assemblies 81 and 82 than the parachute apparatus 10. These additional clustered parachute assemblies 81 and 82 are identical to assemblies 12" and 13" in their individual structure, but help to form a different arrangement of clustered parachute assemblies for increased redundancy and stability of the harness 11". The assemblies 12" and 13" are coupled to the top 16" of the pack 15" at opposed sides 17" and 18", while the assemblies 81 and 82 are coupled to the top 16" of the pack 15" near an intermediate location between the assemblies 12" and 13" and are slightly apart from one another. In addition, a cross member 83 supports the four assemblies in a diamond-shaped arrangement. The cross member 83 has four elongate arms 84 extending from a central point. Each arm 84 is coupled to one of the rings 30" such that the cross member 83 prevents the rings 30" from splaying out away from the harness 11" or away from each other. In one embodiment, the cross member 83 is a flexible framework, constructed from a nylon webbing, paracord, or the like, while in another embodiment, the cross member 83 has a rigid structure that holds the lines 31" away from each another and reduces the likelihood that they will become tangled. The present invention is described above with reference to a preferred embodiment. However, those skilled in the art will recognize that changes and modifications may be made in the described embodiment without departing from the nature and scope of the present invention. To the extent that such modifications and variations do not depart from the spirit of the invention, they are intended to be included within the scope thereof.

The invention claimed is:

1. A redundant clustered parachute apparatus comprising:
   a harness;
   a plurality of lines operatively coupled to the harness, each line having a length; and
   on each line, a plurality of canopies coupled to and along the length of the respective line;
   wherein each canopy coupled to the respective line is coupled to the respective line only.

2. The apparatus of claim 1, wherein the canopies are coupled along an entirety of the length of each line.

3. The apparatus of claim 1, wherein the canopies are coupled to each line in a tiered arrangement along the length of each line.

4. The apparatus of claim 3, wherein the canopies are helically arranged around each line.

5. The apparatus of claim 3, wherein the canopies are diametrically offset on each line.

6. The apparatus of claim 3, wherein each canopy has a frusto-conical body.

7. The apparatus of claim 1, further comprising:
   a ring coupled to the harness, the ring having a circumference; and
   the plurality of lines are coupled to the ring and spaced apart around the circumference of the ring.

8. A redundant clustered parachute apparatus comprising:
   a harness;
   a plurality of lines coupled to the harness, each line having a length; and
   on each line, a plurality of canopies coupled to and along the length of the respective line;
   wherein each canopy coupled to the respective line is coupled to the respective line only; and
   wherein each of the canopies has a frusto-conical shape with an open top and an open bottom.

9. The apparatus of claim 8, wherein the canopies are coupled along an entirety of the length of each line.

10. The apparatus of claim 8, wherein the canopies are coupled to each line in a tiered arrangement along the length of each line.

11. The apparatus of claim 10, wherein the canopies are helically arranged on each line.

12. The apparatus of claim 10, wherein the canopies are diametrically offset on each line.

13. The apparatus of claim 8, further comprising:
    a ring coupled to the harness, the ring having a circumference; and
    the plurality of lines are coupled to the ring and spaced apart around the circumference of the ring.

14. The apparatus of claim 13, further comprising:
    a tether extending across the ring; and
    a riser coupling the tether to the harness.

15. A redundant clustered parachute apparatus comprising:
    a harness;
    a plurality of lines coupled to the harness, each line having a length; and
    on each line, a plurality of canopies coupled to each line in a tiered arrangement along the length of each line;
    wherein each canopy coupled to the respective line is coupled to the respective line only.

16. The apparatus of claim 15, wherein the canopies are coupled along an entirety of the length of each line.

17. The apparatus of claim 15, wherein the canopies are helically arranged on each line.

18. The apparatus of claim 15, wherein the canopies are diametrically offset on each line.

19. The apparatus of claim 15, further comprising:
    a ring coupled to the harness, the ring having a circumference; and
    the plurality of lines are coupled to the ring and spaced apart around the circumference of the ring.

20. The apparatus of claim 19, further comprising:
    a tether extending across the ring; and
    a riser coupling the tether to the harness.

* * * * *